United States Patent
Willingham et al.

(10) Patent No.: US 6,580,472 B1
(45) Date of Patent: Jun. 17, 2003

(54) VEHICLE WINDOW TINTING SYSTEM AND METHOD

(76) Inventors: Michael A. Willingham, 687 Longbow Ct., Stone Mountain, GA (US) 30087; Tammy M. Willingham, 687 Longbow Ct., Stone Mountain, GA (US) 30087

( * ) Notice: Subject to any disclaimer, the term of this patent is extended or adjusted under 35 U.S.C. 154(b) by 0 days.

(21) Appl. No.: 09/548,877

(22) Filed: Apr. 13, 2000

(51) Int. Cl.[7] .............................................. G02F 1/1335
(52) U.S. Cl. ............................ 349/16; 359/275; 430/20
(58) Field of Search ........................... 349/16; 359/275; 430/20; 52/171.3

(56) References Cited

U.S. PATENT DOCUMENTS

| | | | |
|---|---|---|---|
| 3,965,742 A | * 6/1976 | Parker | 374/161 |
| 4,832,468 A | 5/1989 | Ito et al. | |
| 4,893,908 A | 1/1990 | Wolf et al. | |
| 5,197,242 A | * 3/1993 | Baughman et al. | 52/171.3 |
| 5,390,045 A | 2/1995 | Bernard, Jr. | |
| 5,587,828 A | * 12/1996 | Bernard, Jr. | 359/275 |
| 5,598,293 A | 1/1997 | Green | |
| 5,620,799 A | 4/1997 | Sauer | |
| 5,658,699 A | * 8/1997 | Iijima et al. | 430/20 |
| 5,940,216 A | * 8/1999 | Gibbs | 359/601 |
| 6,230,327 B1 | * 5/2001 | Briand et al. | 2/8 |

FOREIGN PATENT DOCUMENTS

JP          08025961     *  1/1996

* cited by examiner

*Primary Examiner*—Huyen Ngo
(74) *Attorney, Agent, or Firm*—Kenneth L Tolar

(57) ABSTRACT

A vehicle window tinting system includes liquid crystal material contained within a liquid crystal cell embedded within the side windows of a vehicle. A liquid crystal cell is likewise embedded within the vehicle rear window and is scripted to form a readable message. The liquid crystal cells are each electrically connected to the vehicle battery via a designated switch. When a switch corresponding to a window is activated, an electrical current is delivered to the liquid crystal cells thereby decreasing the transmittance of the window. If the switch corresponding to the rear window is activated, the readable message appears thereon.

2 Claims, 2 Drawing Sheets

VEHICLE WINDOW TINTING SYSTEM AND METHOD

BACKGROUND OF THE INVENTION

The present invention relates to an automatic window tinting system for a vehicle.

DESCRIPTION OF THE PRIOR ART

Vehicle windows are often tinted to minimize sunlight intrusion into the passenger compartment. Conventional window tinting typically relates to adhesively applying a tinted, transparent layer to each window. However, tinted windows can be a nuisance at night; in addition, not all drivers prefer tinted windows.

Furthermore, in emergency situations, a driver often needs to signal passersby, the police or other emergency response personnel. Although a myriad of emergency signal devices for vehicles exist in the prior art, they include lights or similar obtrusive devices mounted on a window that obstruct the driver's vision. Accordingly, there is currently a need for a device which allows a user to selectively tint a vehicle window while providing an unobtrusive means for displaying a message. Although various automatic window tinting systems exist in the prior art, most are difficult to construct and include expensive electrochromatic window panes or alternatively involve dispensing tinted fluids between glass panels.

For example, U.S. Pat. No. 5,620,799 issued to Sauer discloses an electromagnetic radiation permeable glazing including a sheet of glass having a precisely delimited surface region and a transmitter/receiver for electromagnetic radiation.

U.S. Pat. No. 5,598,293 issued to Green discloses an electrochromic glass for use in cars and buildings including two sheets of glass, two transparent conductor layers, two electrodes and an electrolyte polymer.

U.S. Pat. Nos. 5,587,828 and 5,390,045 issued to Bernard, Jr. disclose an adjustable window tinting system. The various embodiments include the use of a photochromatic glass, electrochromatic glass or a pair of spaced glass panes fillable with a tinted fluid.

U.S. Pat. No. 4,893,908 issued to Wolf et al. discloses an adjustable tint window with an electrochromic conductive polymer.

U.S. Pat. No. 4,832,468 issued to Ito et al. discloses a dimming window including a transparent plate having electrochromic elements therein.

The present invention provides a unique, easy-to-construct window tinting system including window panes having liquid crystals embedded therein which, when voltage is applied thereto, produce a tinted color that obstructs the passage of light through the pane. The liquid crystals provide the distinct advantage of being able to function as both a tinting and message display means.

SUMMARY OF THE INVENTION

The present invention relates to a window tinting system for a vehicle. The system comprises each side and rear vehicle window being constructed with glass having liquid crystals embedded therein. The liquid crystals are electrically connected to the vehicle battery via a switch means. The rear vehicle window includes embedded liquid crystals which are scripted in a predetermined pattern to form a readable message such as a distress signal. The scripted liquid crystals are likewise connected to the vehicle battery via a designated switch means. It is therefore an object of the present invention to provide a vehicle window tinting system which allows a user to selectively tint a select vehicle window with the push of a button.

It is another object of the present invention to provide a vehicle window tinting system that is simple to construct.

It is yet another object of the present invention to provide a vehicle window tinting system that allows a user to display a predetermined message on a vehicle window.

Other objects, features and advantages of the present invention will become readily apparent from the following detailed description of the preferred embodiment when considered with the attached drawings and the appended claims.

DESCRIPTION OF THE PREFERRED EMBODIMENT

Figure 3:
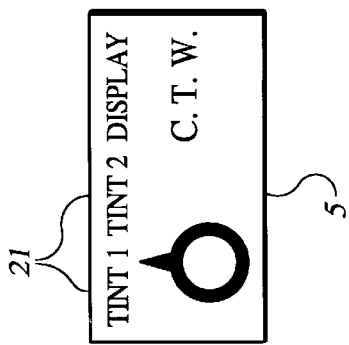
FIG. 3 depicts a switch according to the present invention.
Figure 1:
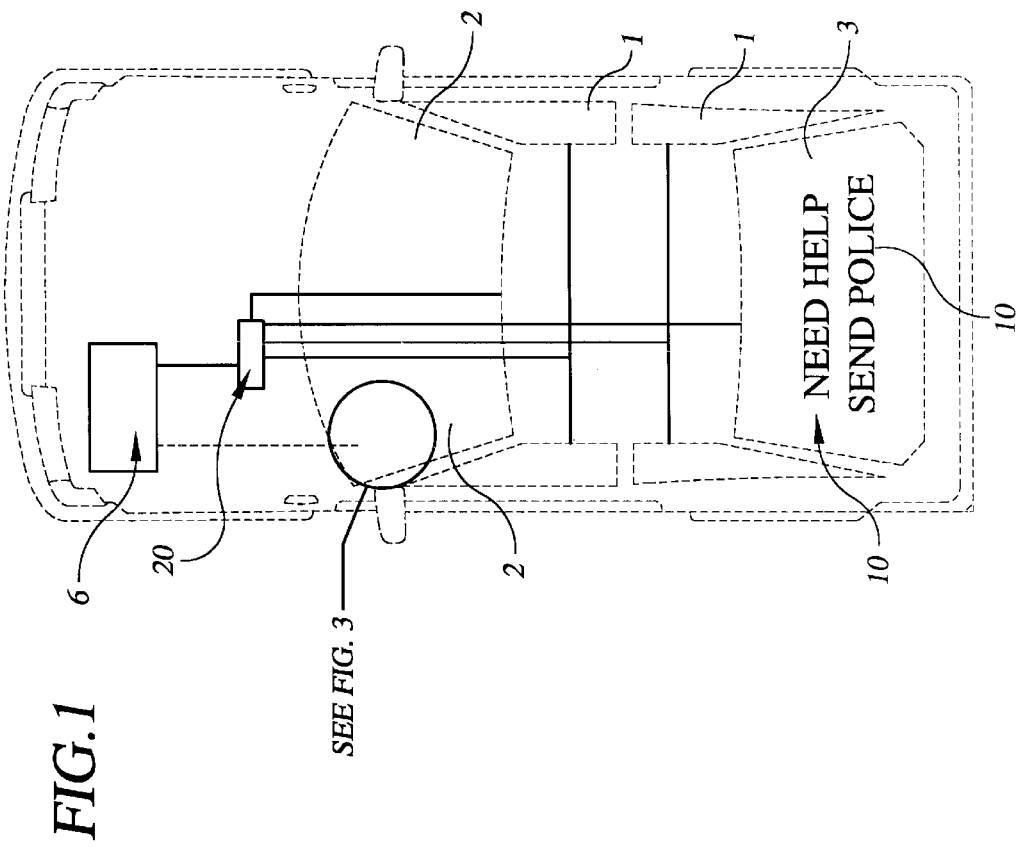
FIG. 1 depicts the tinting system applied to a vehicle.
Figure 2:
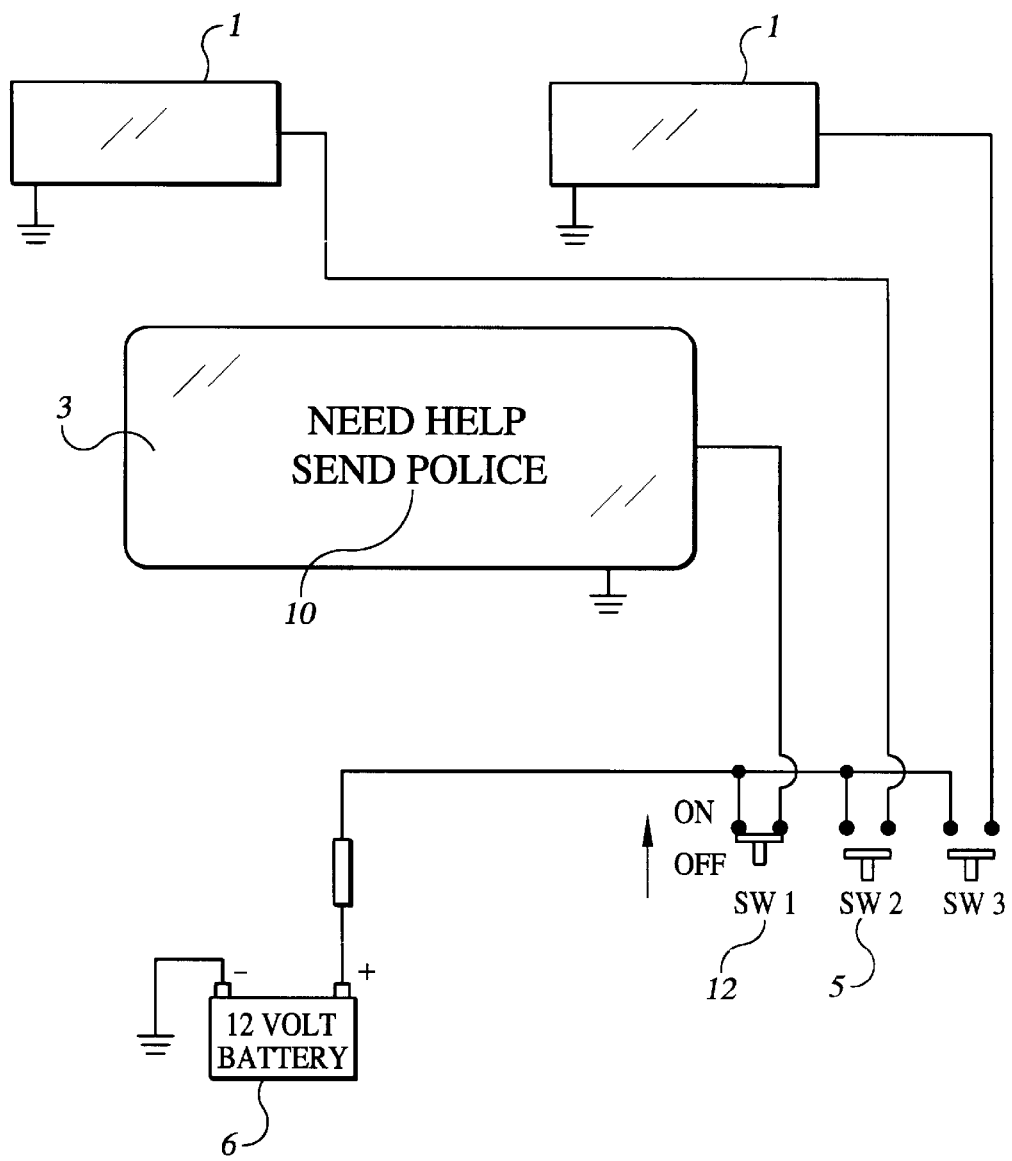
FIG. 2 is a schematic of the window tinting system according to the present invention.

Referring now to FIGS. 1 through 3, the present invention relates to a window tinting system. A vehicle typically includes two or more side windows 1, a windshield 2, and a rear window 3. The tinting system according to the present invention includes constructing each of the side windows with glass having liquid crystals embedded therein. The liquid crystals within each window pane are sandwiched between a pair of electrodes which are electrically connected to a power source 6, such as the vehicle battery, via a switch means 5. The crystals in each window pane are electrically connected to a discrete switch means 5 via a junction box 20 whereby each window may be independently tinted. The switch means are preferably disposed in an easily accessible location within the passenger compartment. By activating the switch means, an electrical current is delivered to the liquid crystals thereby altering the pattern of the molecules contained therein. The resulting pattern change of the liquid crystal molecules thereby alters the transparency of the selected window.

The rear vehicle window is constructed with a plurality of liquid crystal segments embedded therein. The segments are arranged to form a predetermined message 10, such as a distress signal. The segments are likewise electrically connected to the vehicle battery via a designated switch means 12. In an inactive state, the liquid crystal segments are not readily visible so as not to hinder a driver's vision through the rear window. By activating the designated switch means 12, a user may conveniently display the predetermined message on the rear window of the vehicle. Alternatively, the rear window pane may contain liquid crystals embedded across the entire surface area thereof whereby the rear window may be selectively tinted as well. As depicted in FIG. 3, each switch means may also include multiple positions 21, each of which results in a varying amount of current being delivered to the crystals whereby varying degrees of tinting may be selected.

To use the above described device, a user activates the switch means corresponding to the window that he or she wishes to tint. Upon activation of the switch means, an electrical current is delivered to the liquid crystals embedded within the window thereby causing the molecular structure thereof to change. Accordingly, the degree of transparency of the selected window pane will be altered. If the user wishes to remove the tinting, the appropriate switch means is disabled whereby electric current to the crystals is removed and the crystals return to their original state. Should the user wish to display the predetermined message, the switch means 12 corresponding to the rear window is activated.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a vehicle having a plurality of windows, a battery and a passenger compartment, a window tinting system comprising:

liquid crystal material embedded within each of said windows;

a plurality of variable switches positioned within said passenger compartment, each of said variable switches is in discrete communication with the liquid crystal material embedded within a select one of said windows and said battery, each of said variable switched is for selecting a variable amount of voltage to be delivered from said battery to said liquid crystal material within said select one of said windows to produce a desired transmittance for tinting said select one of said windows.

2. The window tinting system according to claim 1 wherein the liquid crystal material is embedded within at least one of said windows contained in a liquid crystal cell that is scripted to form a readable message, said scripted liquid crystal cell being electrically connected to said battery and a designated switch positioned within said passenger compartment whereby said message is only visible upon activation of said designated switch.

* * * * *